United States Patent
Gros et al.

(10) Patent No.: US 10,679,338 B2
(45) Date of Patent: Jun. 9, 2020

(54) THREE-DIMENSIONAL MODELING OF AN OBJECT

(71) Applicant: General Electric Company, Schenectady, NY (US)

(72) Inventors: Eric Michael Gros, Waukesha, WI (US); Junli Ping, Clifton Park, NY (US); Arpit Jain, Niskayuna, NY (US); Ming-Ching Chang, Clifton Park, NY (US); Peter Henry Tu, Niskayuna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 43 days.

(21) Appl. No.: 15/684,695

(22) Filed: Aug. 23, 2017

(65) Prior Publication Data
US 2019/0066283 A1 Feb. 28, 2019

(51) Int. Cl.
*G06T 7/00* (2017.01)
*G06T 7/11* (2017.01)
(Continued)

(52) U.S. Cl.
CPC ........... *G06T 7/001* (2013.01); *G05D 1/0094* (2013.01); *G06K 9/00208* (2013.01); *G06T 7/11* (2017.01); *G06T 7/40* (2013.01); *G06T 7/73* (2017.01); *G06T 7/74* (2017.01); *G06T 17/00* (2013.01); *B64C 39/024* (2013.01); *B64C 2201/123* (2013.01); *G06T 2200/04* (2013.01); *G06T 2200/08* (2013.01); *G06T 2207/10028* (2013.01); *G06T 2207/10032* (2013.01); *G06T 2207/20021* (2013.01); *G06T 2207/30108* (2013.01); *G06T 2207/30244* (2013.01)

(58) Field of Classification Search
CPC ..... G06T 17/00; G06T 2200/04; G06T 7/001; G06T 7/11; G06T 7/74; G06T 7/40; G06T 7/73; G06K 9/00214; G06K 9/6218; G06K 9/00208; G05D 1/0094
See application file for complete search history.

(56) References Cited

U.S. PATENT DOCUMENTS

| 5,706,419 A * | 1/1998 | Matsugu | G06T 17/00 345/420 |
| 6,571,012 B1 * | 5/2003 | Pettigrew | H04N 9/75 348/592 |

(Continued)

OTHER PUBLICATIONS

Yamazaki et al., "3-D Object Modeling by a Camera Equipped on a Mobile Robot", Proceedings—IEEE International Conference on Robotics and Automation, (Year: 2004).*

(Continued)

*Primary Examiner* — Kenny A Cese
(74) *Attorney, Agent, or Firm* — Fletcher Yoder, P.C.

(57) ABSTRACT

The present approach relates to the use of a point cloud of an object to initialize or seed a space carving technique used to generate a 3D model of the object. In one implementation, feature matching is performed on 2D images, with matched features constituting the points of a point cloud model. The point cloud generated in this manner, is one input of a foreground/background segmentation algorithm, which generates a set of segmented 2D images used by a space carving routine to generate a 3D model of the object.

11 Claims, 6 Drawing Sheets

(51) Int. Cl.
*G06T 7/40* (2017.01)
*G06T 7/73* (2017.01)
*G06K 9/00* (2006.01)
*G05D 1/00* (2006.01)
*G06T 17/00* (2006.01)
*B64C 39/02* (2006.01)

(56) References Cited

U.S. PATENT DOCUMENTS

| | | | | |
|---|---|---|---|---|
| 2006/0012597 A1* | 1/2006 | Chakraborty | ...... | G06K 9/00214 345/419 |
| 2006/0232583 A1* | 10/2006 | Petrov | ...... | G06K 9/20 345/419 |
| 2015/0317821 A1* | 11/2015 | Ding | ...... | G06T 7/00 345/420 |
| 2017/0206648 A1* | 7/2017 | Marra | ...... | B64C 39/024 |
| 2017/0220887 A1* | 8/2017 | Fathi | ...... | G06K 9/00201 |
| 2018/0211373 A1* | 7/2018 | Stoppa | ...... | G06T 7/55 |
| 2018/0211399 A1* | 7/2018 | Lee | ...... | G06T 7/529 |
| 2018/0322695 A1* | 11/2018 | Chapman | ...... | G06T 15/50 |

OTHER PUBLICATIONS

Yamazaki et al., 3-D Object Modeling by a Camera Equipped on a Mobile Robot (Year: 2004).*

3-D Object Modeling by a Camera Equipped on a Mobile Robot (Year: 2004).*

Kiriakos N. Kutulakos et al., A Theory of Shape by Space Carving, 2000 Klawer Academic Publishers, Printed in the Netherlands, Mar. 24, 2000, 34 pages.

Yamazaki, K., et al., "3-D object modeling by a camera equipped on a mobile robot," IEEE International Conference on Robotics and Automation, pp. 1399-1405 (2004).

International Search Report and Written Opinion issued in connection with corresponding PCT Application No. PCT/US18/41222 dated Oct. 29, 2018.

* cited by examiner

THREE-DIMENSIONAL MODELING OF AN OBJECT

TECHNICAL FIELD

The subject matter disclosed herein relates to creating a three-dimensional model of an object, such as an industrial, commercial, or government asset.

BACKGROUND

Various entities may own or maintain different types of assets as part of their operation. Such assets may include physical or mechanical devices, structures, or facilities which may, in some instances, have electrical and/or chemical aspects as well. Such assets may be used or maintained for a variety of purposes and may be characterized as capital infrastructure, inventory, or by other nomenclature depending on the context. For example, assets may include distributed assets, such as a pipeline or an electrical grid as well as individual or discrete assets, such as an airplane, a wind turbine generator, a radio tower, a steam or smoke stack or chimney, a vehicle, and so forth. Assets may be subject to various types of defects (e.g., spontaneous mechanical defects, electrical defects as well as routine wear-and-tear) that may impact their operation. For example, over time, the asset may undergo corrosion or cracking due to weather or may exhibit deteriorating performance or efficiency due to the wear or failure of component parts.

Typically, one or more human inspectors may inspect, maintain, and repair the asset. For example, the inspector may locate corrosion on the asset, may locate and quantitatively or qualitatively assess cracks or defects on the asset, may assess an asset for the degree of wear-and-tear observed versus what is expected, and so forth. However, depending on the location, size, and/or complexity of the asset, having one or more human inspectors performing inspection of the asset may take away time for the inspectors to perform other tasks or may otherwise be time consuming and labor intensive, requiring personnel time that might be more productively spent elsewhere. Additionally, some inspection tasks may be dull, dirty, or may be otherwise unsuitable for a human to perform. For instance, some assets may have locations that may not be accessible to humans due to height, confined spaces, or the like. Further, inspections may be performed at times that are based on schedules resulting in either over-inspection or under-inspection.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the invention may encompass a variety of forms that may be similar to or different from the embodiments set forth below.

In one embodiment, a method is provided for generating a 3D model of an object. In accordance with this embodiment, feature matching is performed on a set of two-dimensional (2D) images to generate a point cloud model of an object. The point cloud model is provided as an input to a segmentation algorithm. The 2D images or subsamples of the 2D images are segmented using the segmentation algorithm to generate a plurality of 2D segmented images. A space carving operation is performed on an initial volume using the 2D segmented images to generate a 3D model of the object.

In a further embodiment, a method for inspecting an object is provided. In accordance with this embodiment, a flight plan of an unmanned device is executed about the object. At waypoints on the flight plan, a series of two-dimensional (2D) images of the object are acquired at a plurality of views about the object. A point cloud model is generated using the series of 2D images. The point cloud model is used to segment the 2D images or subsamples of the 2D images to generate segmented images. A space-carving operation is performed using at least the segmented images to generate a 3D model of the object. The 3D model is evaluated as part of an inspection of the object.

In an additional embodiment, an image analysis system is provided. In accordance with this embodiment, the image analysis system includes one or more processors configured to execute routines and a memory storing one or more non-tangible, processor executable routines. When executed by the one or more processors, the stored routines cause acts to be performed comprising: matching features on a set of two-dimensional (2D) images to generate a point cloud model of an object; segmenting the 2D images or sub-samples of the 2D images based on the point cloud to generate a plurality of segmented images, each segmented image with a corresponding estimated camera pose; and performing a space carving operation on an initial volume using the segmented images and corresponding estimated camera poses to generate a 3D model of the object.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
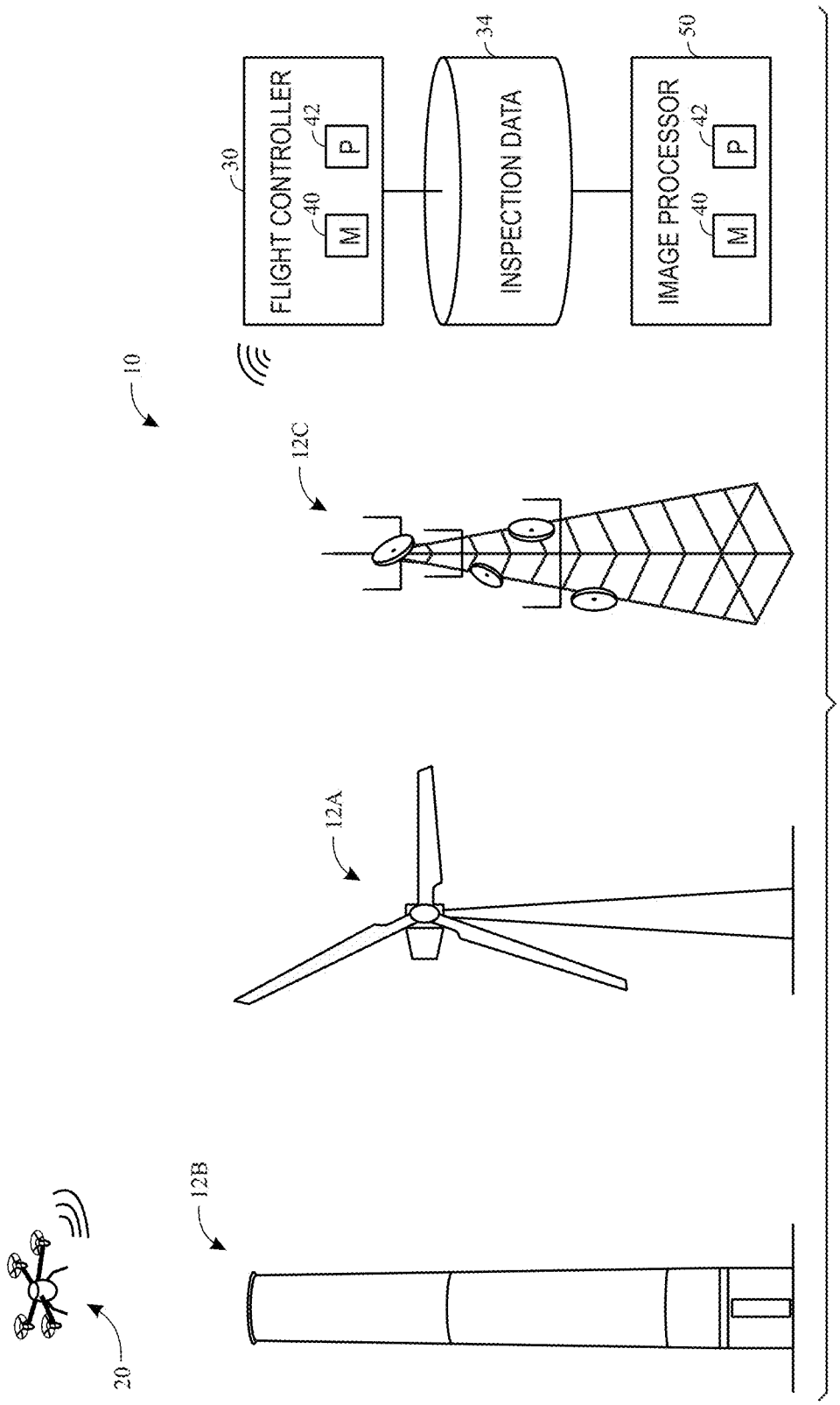
FIG. 1 shows various types of assets suitable for inspection and modeling in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As discussed herein, the present approach relates to generating three-dimensional (3D) models of objects using space carving approaches, such as space carving approaches initialized using information derived from a sparse point cloud. Such 3D models may be useful in an inspection context, including inspections performed using unmanned vehicles or drones and/or inspections implemented by automated or computer-based routines. In particular, such 3D models may be generated using information acquired using such inspection sources and may then be compared to known or expected models to identify potential fault regions or areas deserving additional or follow-up review.

By way of example, such inspections may be performed using unmanned or robotic devices, such as unmanned aerial vehicles (UAVs), unmanned submersible vehicles (USVs), or other autonomously moving vehicles that may be characterized as drones or robots. For simplicity, to the extent the term "drone" is used herein, though it should be appreciated that this terminology is intended to encompass all variations, of UAVs, USVs, robotic devices, and so forth that are capable of programmable movement with no or limited human oversight. Such programmable movement can be based on either locally generated path waypoints or guidance or path guidance and waypoints generated by a remote system and communicated to the drone. Thus, as used herein, such devices move during an operational phase or period entirely or primarily without direct human intervention or control and/or with limited human intervention or oversight. In accordance with present approaches, such devices may be operated to move along a flight plan, along which the devices acquire inspection data, such as video or still image data, LIDAR data, or other data that can be acquired by sensors or cameras that can be affixed to a device moving along the flight plan. In general, such inspections may be performed on one or more assets including, but not limited to, power generation assets, communication assets, transportation assets, mining or underground pumping assets, manufacture or construction assets and so forth.

Though the phrase "flight plan" is used generally herein, it should be appreciated that this phrase does not necessitate aerial movement, but instead relates to any one-dimensional (1D) (such as along a track), two-dimensional (2D) (such as along a defined or undefined planar route), or three-dimensional (3D) (such as movement in the air, under water, or on a structure in where depth or altitude is also traversable), or four-dimensional (4D) (such as where there are defined temporal aspects) path or route along which a drone moves as part of an inspection plan. Thus, a "flight plan" as used herein may be characterized as any 1D, 2D, 3D, or 4D route or path along which device such as a drone or robot is moved to perform a sensor-based inspection of an asset. Such a path may be adaptive, as discussed herein, and may consist of one or more waypoints along which the drone proceeds in an ordered fashion, with the sequence and location of the waypoints defining the path or route. It should be appreciated that such a flight plan may also incorporate not only temporal and/or spatial locations, but also orientation and/or alignment instructions for movement along the path and/or to exhibit at a given waypoint. Thus, the flight plan may also specify parameters such as roll, pitch, and yaw for the drone to exhibit at different points along the flight plan as well as two- or three-dimensional alignment characteristics that may relate to the direction in which a sensor or camera is pointing at a point along the flight plan. Thus, the flight plan may address not only where or when a drone is with respect to an inspection site but, at a given location or waypoint, the direction the drone is facing or otherwise oriented with respect to. Further, even at the same waypoint and orientation, images may be acquired at different magnifications, wavelengths, or other optical parameter such that effectively the image constitutes a different view.

As discussed herein, the present approach facilitates the inspection of assets by allowing generation of a 3D model of the asset based on acquired sensor data gathered during an inspection. Operational data for the asset may be incorporated into planning or adapting the flight plan so as to facilitate inspection or visualization of the asset at certain operational phases or moments.

To facilitate explanation and provide useful real-world context, various examples such as wind turbine generators, radio transmission towers, smokestacks, and so forth are provided herein. It should be appreciated however that such examples are provided merely to facilitate explanation, and the present approach is suitable for use with a wide range of other assets and at various other types of sites. Thus, the present approach is not intended to be limited to the context of the present examples.

With the preceding in mind, and turning to the figures, FIG. 1 depicts aspects of a system 10 employing one or more drones 20 suitable for inspecting one or more assets 12, such as a wind turbine generator 12A, radio tower 12C, smokestack 12B, or other suitable asset.

FIG. 1 also depicts a flight controller 30 that is responsible for coordinating operation of one or more drones 20, such as for inspection of an asset 12. In one embodiment, the drone(s) 20 have onboard cellular or network connectivity and can communicate with the flight controller 30 at least prior to beginning an inspection. In certain implementations the cellular or network connectivity of the drone(s) 20 allow communication during an inspection, allowing inspection data to be communicated to the flight controller 30 or other components (e.g., inspection data repository 34) and/or allowing the flight controller to communicate changes to the flight plan to a given drone 20.

In the depicted example, the flight controller 30 is depicted as a processor-based system having a one or more processors 40 and a memory 42. For example, the processor 40 may execute routines stored in the memory 42 (and/or utilize data stored in the memory 42) to generate commands or flight plans for the drone(s) 20 used in an inspection process.

In the depicted example the flight controller 30 is depicted as in communication with an inspection data database 34, such as an image repository. By way of example, videos, images, LIDAR data, depth sensor data, or other relevant sensor or camera data acquired by the one or more drones 20 during an inspection may be uploaded to the inspection data database 34 as acquired or as a batch after an inspection flight plan is completed. Alternatively, in other implementations the inspection data may be provided to the database 34 by other means or channels, such as via direct transmission from the drone 20 and/or via other intermediary communication structures, such as a dedicated inspection data communication circuit operating independent of the flight controller.

The data within the inspection data database 34 may be used to generate a 3D model as discussed herein, which may in turn be reviewed or validated as part of the inspection process. In certain implementations, a 3D model may be generated and assessed in real time or near-real-time, in which case the flight controller 30 may on-the-fly update the flight plan of a drone 20 if acquisition of additional inspection data is warranted (e.g., additional video or images from a different range or angle). The 3D model may be generated using processes described herein using processing components 40 of the flight controller and/or of an image processing system 50 having access to the inspection data 34 are used to generate a 3D model of the asset 12.

In the depicted example, the flight controller 30, inspection database 34, and image processor 50 are depicted as separate and discrete entities. However, it should be appreciated that, depending on the implementation, certain of these aspects may be provided as different functions or functionalities implemented by a single or common processor-based system. Conversely, the depicted functionalities may be implemented in a distributed or dispersed manner, with certain aspects being local to the asset 12, to the drone control or operational facility and/or other locations remote from the asset 12. In such distributed implementations, the depicted aspects may still be communicatively linked, such as over one or more network connections.

As discussed herein, as part of an asset inspection process, it may be useful to generate a model, such as a 3D model, of the inspected object using the acquired inspection data, such as video or image data.

One approach to 3D modeling is generating a point cloud. In such approaches, comparable data acquired at different views with respect to an object may be used to identify features or points within each object that may be matched between the different views. With knowledge of the geometry associated with the different views, matched points may be used to generate a 3D representation of the points, i.e., a point cloud, with the number of points matched corresponding to the density of the point cloud.

As may be appreciated, the data used in generating a point cloud may vary and may include visual type data (such as still images (including black and white, grayscale, or color images), frames from videos, or other video derived data), LIDAR data, depth sensor data, or combinations of these or other data types. The data, irrespective of type, is generally acquired at multiple positions and orientations with respect to the structure to be modeled such that for any given feature or point, the point seen from a different orientation in at least some minimal number of views (e.g., two images at different locations and orientations). In this manner, assuming a known geometry of the different data acquisitions, a geometry of a matched point in multiple views may be inferred.

As may be appreciated, matching of a given feature or point may occur within only some subset of the views (e.g., images). For example, for an asset imaged or sensed over multiple views dispersed roughly around the asset, a point or feature on one surface or side of the asset would only be discernible in those views directed to that surface or side. Indeed, depending on the geometry of the asset, the point or feature in question may only be discernible on even subset of the views of the relevant surface or side.

The resulting aggregation of matched points, with positions inferred from the respective acquisition geometries of the respective sensed data sets, may be described as a point cloud, such as a sparse point cloud. The point cloud may serve to some degree as a three-dimensional representation of the modeled object, though in isolation may be subject to various deficiencies.

Figure 2A:
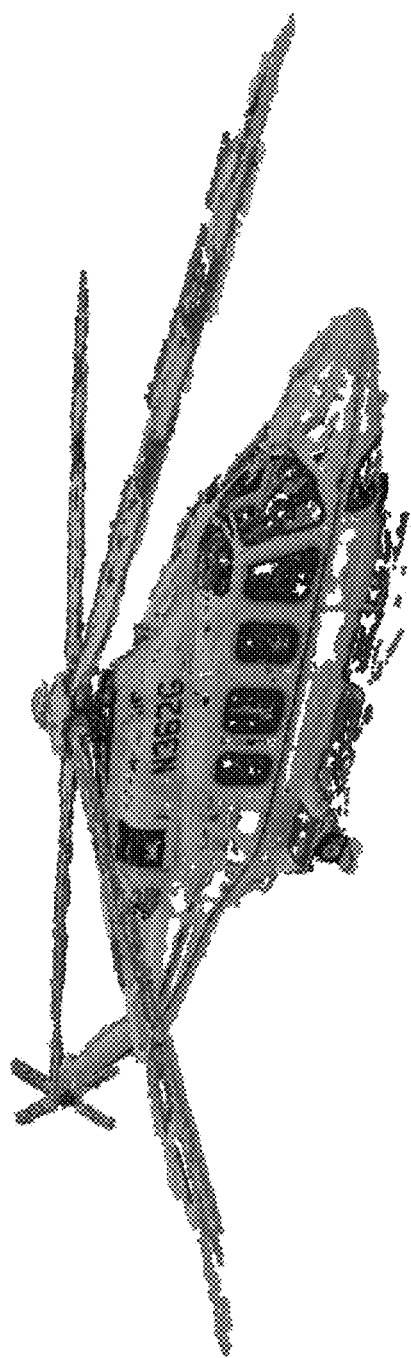
FIGS. 2A, 2B, and 2C depict examples of point clouds, in accordance with aspects of the present disclosure.
Figure 2C:
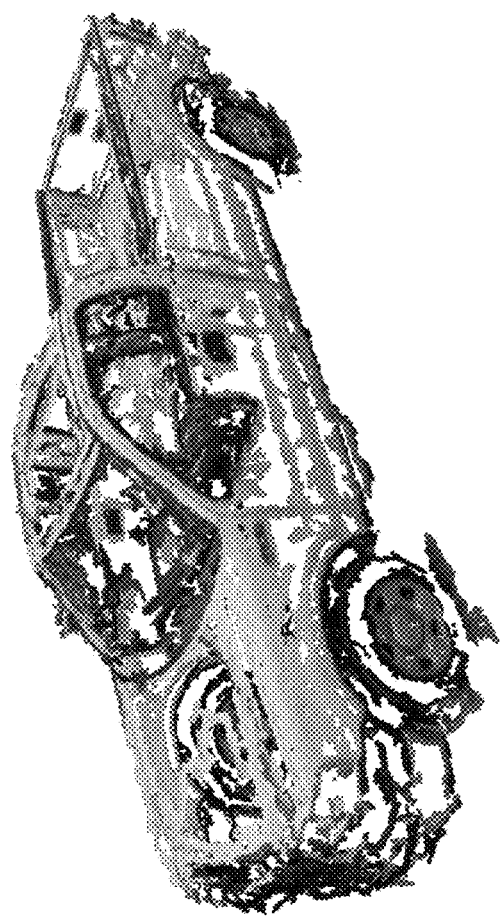
Figure 2B:
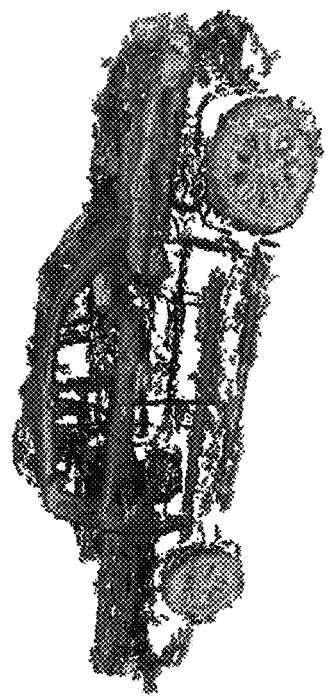

For example, point cloud representations may be subject to noise and/or certain artifacts. By way of example, points used in the point cloud representation are those that can be discerned and matched in multiple views of the object being modeled. Thus, for highly uniform regions or surfaces (e.g., smooth planar surfaces, regions of uniform color, and so forth), no particular point or feature may be discerned or otherwise identified within the uniform region, thus resulting in point matching only along the edges and/or near non-uniformities with respect to such regions. Thus, such point clouds may fall short of being true three-dimensional representations. Techniques such as Poisson surface filling may be employed to address irregularities, but are typically insufficient without some regularizing surface being available. Examples of various point clouds 80 are shown in FIGS. 2A, 2B, and 2C, depicting respectively a helicopter and two different trucks.

Thus, from an inspection standpoint, generating a point-cloud 80 as a 3D representation using sensed data (e.g., images) acquired by a drone or other unmanned apparatus navigating about an asset may be inadequate for evaluating the condition or state of the asset.

Figure 3:
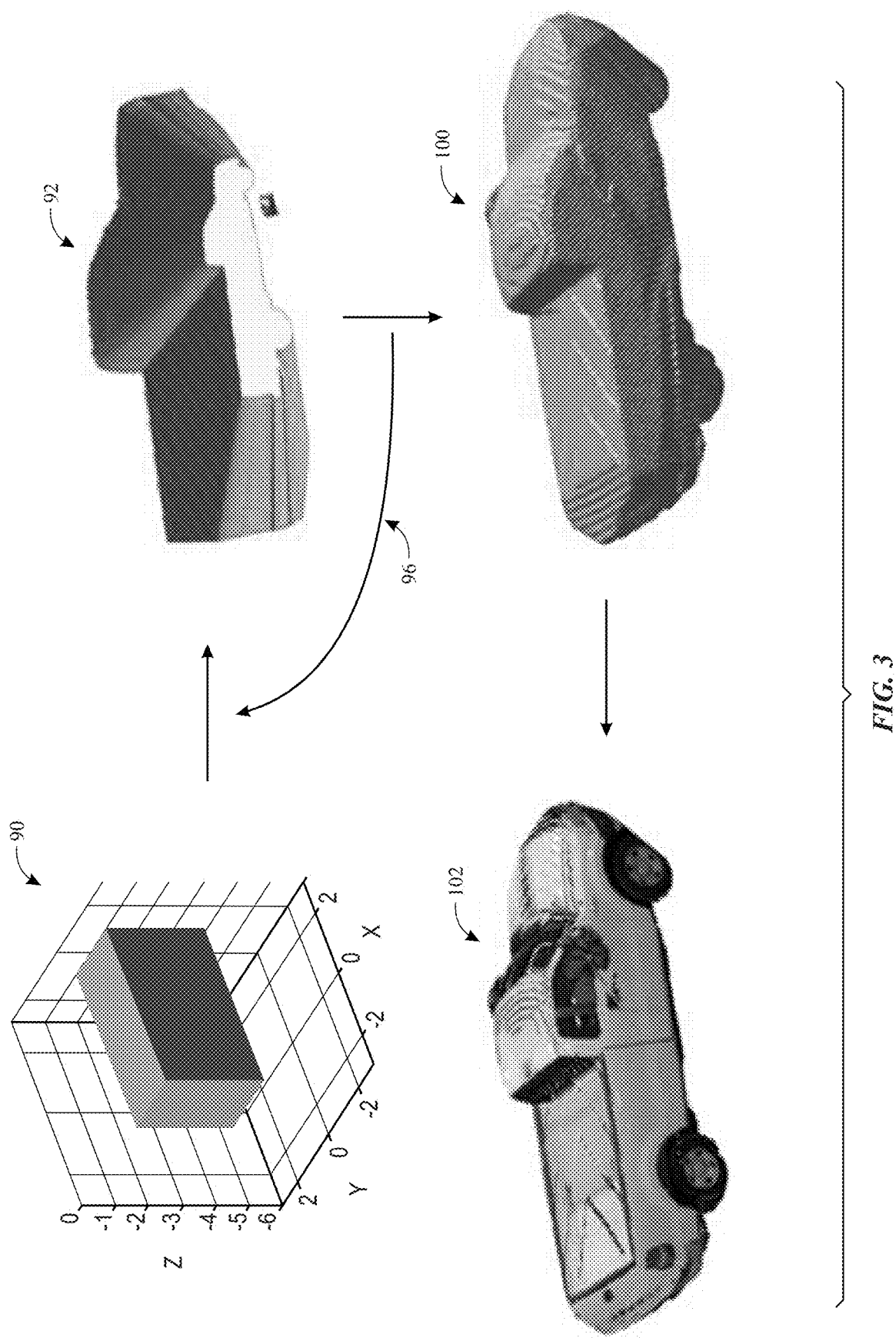
FIG. 3 depicts an example of a process flow for space carving a 3D representation, in accordance with aspects of the present disclosure.

Alternatively, another 3D modeling approach is space-carving. Turning to FIG. 3, a flow for such an approach is shown. In this example, an initial volume 90 is provided. A 2D view of the object (e.g., an asset undergoing inspection) is acquired, such as from a set of images acquired by a drone or unmanned device executing a flight plan about the object during which images (or other sensed data) are acquired. For each image to be processed, the object is segmented from the image data, such as by performing an edge identification and segmenting the foreground and background based on the edge identification.

Based on the known geometry of the acquisition for each segmented image of the object, the view is oriented in 3D space with respect to the volume 90. Each segmented view is then projected (step 92) onto the initial volume based on the known geometry of the acquisition and regions outside of the projection for each view are "carved" out or otherwise removed from the volume being generated as a 3D model. The process is repeated (arrow 96) for each available view using the respected segmented image of the object (e.g., asset) at that view, resulting in a carved 3D shape 100 being formed as the process iterates. If useful, a color or texture may be mapped onto the surface of the carved 3D shape 100 to complete the generated model (step 102)

Figure 4:
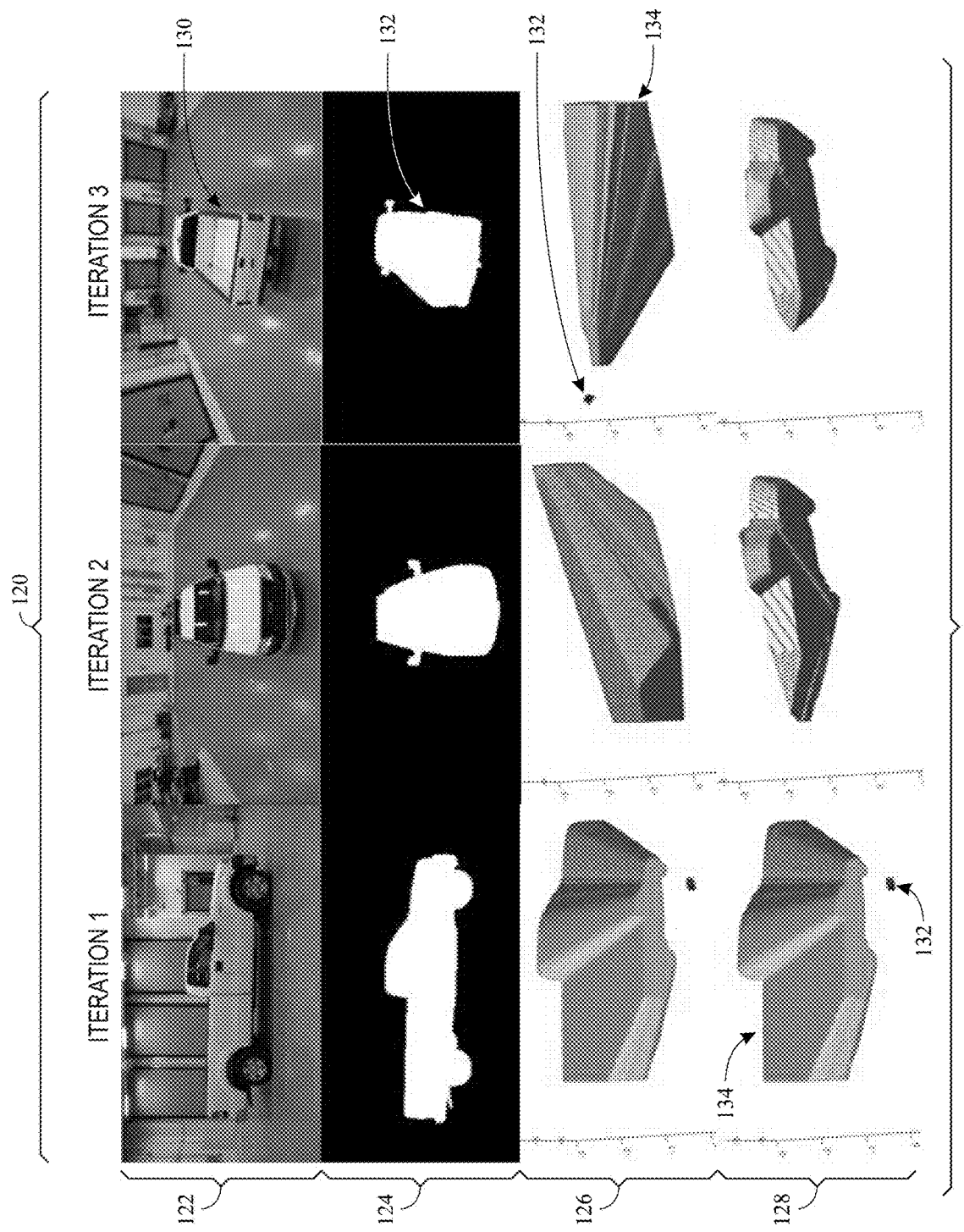
FIG. 4 depicts steps in a space carving process, in accordance with aspects of the present disclosure.

A further example of this process is shown in FIG. 4. As shown in FIG. 4, three iterations of the space carving process and the corresponding results are shown. Each column 120 corresponds to one iteration (i.e., the processing of one view), while the rows within a column visually depicts sequential aspects of the corresponding iteration. For example, the first row 122 depicts a respective image of a truck taken at a different view for each iteration 120. In this example, the different images may correspond to images acquired at different view positions and orientations by a drone as it executes a flight plan about an object 130 (here a truck) or other asset to be modeled, such as may be part of an inspection process.

The second row 122 depicts a segmented image 132 of the object 130 after segmentation from the initial image. In the depicted example, the segmented image 132 is depicted as a silhouette, i.e., in a binary manner, with all pixels segmented or otherwise identified as part of the object 130 having a first intensity value (e.g., 1) and non-object pixels having a second intensity value (e.g., 0).

Based on the segmented image 132 and the geometry (i.e., position and orientation) at which the initial image is acquired, the segmented image 132 (i.e., silhouette) is projected onto a volume 134 that is "carved" to exclude areas or regions outside the projection. Row 126 in the depicted example shows the results of projecting the volume based solely on the silhouette within the respective iteration (i.e., column), essentially illustrating a single step or view space-carving operation. Row 128, however, shows the accumulated effects of adding views to the space carving process, effectively carving the previous carved view with the additional segmented images. Thus, row 128 illustrates the process by which the volume 134 is progressively carved by each view to model the object 130 of interest. Thus, even after only three iterations, the volume 134 has begun to resemble a truck, which is the object being modeled.

As may be seen in the preceding space-carving examples, these approaches rely on segmenting foreground from background in a 2D image context. However, there is no way to extract depth information from a single 2D image. This can be seen in FIG. 4, where the bed of the truck 130 can not be distinguished in the silhouettes 132. Consequently, the resulting space-carved model also does not accurately reflect the depth associated with the bed of the truck being modeled.

In accordance with the present approach a 3D point cloud, such as a rough or sparse point cloud, is utilized as a seed input to the space carving process, thereby facilitating the extraction of depth information and the segmentation of foreground and background from the 2D images.

Figure 5:
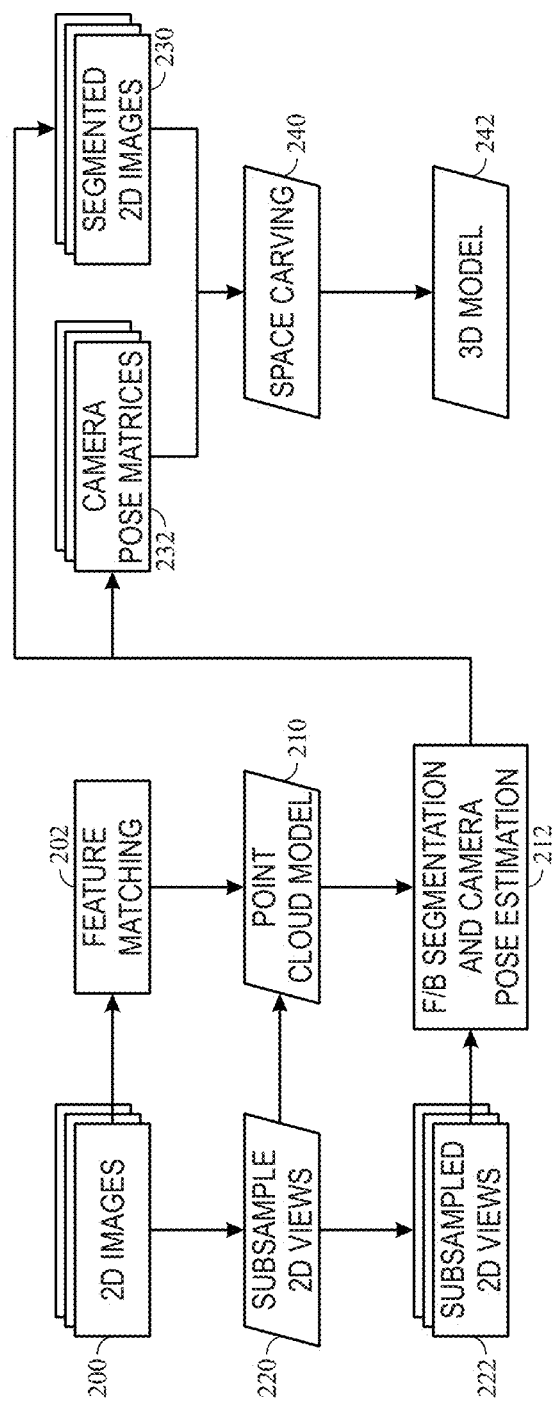
FIG. 5 depicts a process flow of steps for initializing a space carving operation with a point cloud, in accordance with aspects of the present disclosure.
Figure 6:
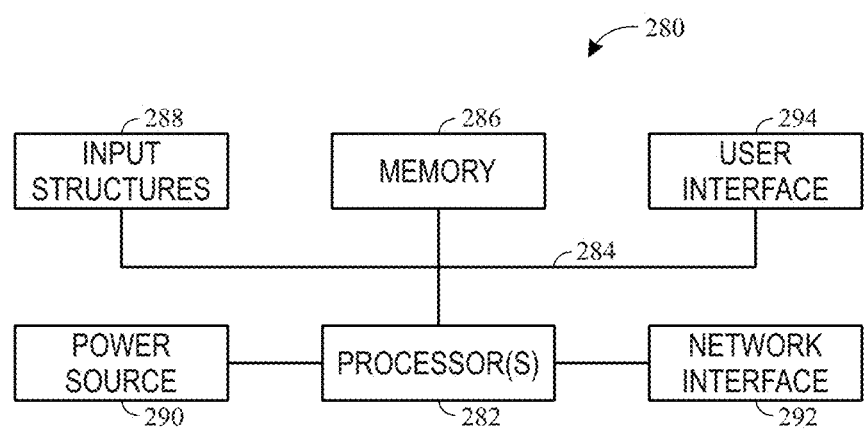
FIG. 6 is a block diagram of a computing device capable of implementing the present approach, in accordance with aspects of the present disclosure.

An example of such a process is shown in FIG. 5. In this example, 2D images 200, such as may be acquired by a drone or other vehicle executing an inspection flight plan about an object or asset, are provided as an input to a feature matching algorithm 202 configured to identify features within the images and, for matched features, to generate a point cloud model 210 of the object represented in the images 200.

In this example, the point cloud model 210 is used as an input to the foreground/background image segmentation and camera pose estimation algorithm 212. In addition, the 2D images 200 are subsampled (step 220) to generate subsampled 2D views 222, which are also an input to the segmentation and pose estimation algorithm 212. In the depicted example, the segmentation and camera pose estimation algorithm 121, using the subsampled views 222 and 3D point cloud model 212 as inputs, generates segmented 2D images 230 and corresponding camera pose data 232 as outputs. Unlike conventional 2D views, the 2D images 230 segmented using surface and depth information determined from the point cloud model 210 convey depth information for the surface represented in the segmented images 230. As a result, when used in a space carving operation (step 240), the resulting 3D model 242 better reflects the surfaces and contours of the modeled object or asset. In one embodiment, the 3D model generated in this manner may be a water-tight (i.e., complete surface with no gaps) convex hull representation of the modeled object with color mapping.

In accordance with certain aspects, a model 242 generated in this manner may be used as part of an inspection process. For example, the model 242 may be reviewed by a human or automated reviewed to identify surface or structural irregularities deserving further or follow-up inspection. Such a follow-up inspection may include an on-site visit by a human inspector or a targeted drone flight to image or view a specific section of an asset for which the model suggests an issue. Automated evaluation or comparison of the model 242 may be against a CAD or baseline model or figure of expected surfaces and/or against a prior model 242 generated during an inspection occurring at some time interval before the current inspection, which may be useful for assessing a rate of change or deterioration in an asset.

In certain aspects, it may be useful to evaluate the degree of error in a representation or model 242. By way of example, in one embodiment, the error evaluation may be in the form of comparing landmark distances in the actual asset (i.e., the physical object) being modeled versus what is observed in the model 242. For example, a scale factor between the model 242 and physical object may be estimated. Once the scale factor is known, the scale adjusted distances between one or more sets of landmarks may be compared, such as using a root mean square error calculation. Such an approach may yield a root mean square error in a suitable unit of measure, which can be used to assess the degree of error between the model and physical object.

As will be appreciated some or all of the preceding aspects may be performed or otherwise implemented using a processor-based system such as shown in FIG. 1. Such a system may include some or all of the computer components depicted in FIG. 1. FIG. 1 generally illustrates a block diagram of example components of a computing device 280 and their potential interconnections or communication paths, such as along one or more busses. As used herein, a computing device 280 may be implemented as one or more computing systems including laptop, notebook, desktop, tablet, or workstation computers, as well as server type devices or portable, communication type devices, such a cellular telephones, and/or other suitable computing devices.

As illustrated, the computing device 280 may include various hardware components, such as one or more processors 282, one or more busses 284, memory 286, input structures 288, a power source 290, a network interface 292, a user interface 294, and/or other computer components useful in performing the functions described herein.

The one or more processors 282 are, in certain implementations, microprocessors configured to execute instructions stored in the memory 286 or other accessible locations. Alternatively, the one or more processors 282 may be implemented as application-specific integrated circuits (ASICs), field-programmable gate arrays (FPGAs), and/or other devices designed to perform functions discussed herein in a dedicated manner. As will be appreciated, multiple processors 282 or processing components may be used to perform functions discussed herein in a distributed or parallel manner.

The memory 286 may encompass any tangible, non-transitory medium for storing data or executable routines, including volatile memory, non-volatile memory, or any combination thereof. Although shown for convenience as a single block in FIG. 1, the memory 286 may actually encompass various discrete media in the same or different physical locations. The one or more processors 282 may access data in the memory 286 via one or more busses 284.

The input structures 288 are used to allow a user to input data and/or commands to the device 280 and may include mice, touchpads, touchscreens, keyboards, and so forth. The power source 290 can be any suitable source for providing power to the various components of the computing device 280, including line and battery power. In the depicted example, the device 100 includes a network interface 292. Such a network interface 292 may allow communication with other devices on a network using one or more communication protocols. In the depicted example, the device 100 includes a user interface 114, such as a display configured to display images or date provided by the one or more processors 282.

As will be appreciated, in a real-world context a processor-based systems, such as the computing device 280 of FIG. 1, may be employed to implement some or all of the present approach, such as to receive 2D images as inputs to generate a point cloud and/or to use such a point cloud to initialize and execute a space carving operation to model an asset or object.

Technical effects of the invention include using a point cloud generated for an object to initialize or seed a space carving technique used to generate a 3D model of the object. In one implementation, 2D images are acquired at multiple view angles about the object to be modeled. Feature matching is performed on the 2D images, with matched features constituting the points of the point cloud model. The point cloud generated in this manner, along with subsampled 2D views, is input to a foreground/background segmentation algorithm, which generates a set of segmented 2D images with corresponding camera pose estimates. The camera pose estimates and segmented 2D images in turn are input to a space carving routine, which outputs a 3D model of the object.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of generating a 3D model of an object, comprising:
   performing feature matching on a set of two-dimensional (2D) images to generate a three dimensional (3D) point cloud model of an object, wherein performing the feature matching on the set of 2D images comprises matching features of the object present in two or more 2D images of the set of 2D images, wherein the features constitute points of the 3D point cloud model;
   providing the 3D point cloud model as an input to a segmentation routine;
   segmenting foreground and background of the set of 2D images or subsamples of the set of 2D images based on the 3D point cloud model to generate a plurality of 2D segmented images defining silhouettes of the object;
   projecting the silhouettes on an initial volume to generate a plurality of projection regions;
   performing a space carving operation on the initial volume by excluding volumes outside of the plurality of projection regions from the initial volume to generate the 3D model of the object; and
   comparing the 3D model to a prior 3D model of the object or to landmark distances observed in the object to determine a degree of error in the 3D model.

2. The method of claim 1, wherein segmenting the foreground and the background of the set of 2D images or the subsamples of the set of 2D images outputs respective camera pose estimations for each of the plurality of 2D segmented images.

3. The method of claim 2, wherein the space carving operation uses the respective camera pose estimations associated with each of the plurality of 2D segmented images to generate the 3D model.

4. The method of claim 1, wherein the set of 2D images is acquired by a drone executing a flight plan about the object.

5. The method of claim 1, wherein the object is an industrial asset, a commercial asset, or infrastructure.

6. The method of claim 1, wherein the 3D model comprises a water-tight convex hull representation of the object.

7. The method of claim 1, further comprising:
   comparing the 3D model to the prior 3D model to identify surface or structural irregularities.

8. The method of claim 1, wherein the space carving operation is provided with a respective camera pose estimation for each of the plurality of 2D segmented images.

9. The method of claim 1, wherein determining the degree of error in the 3D model comprises comparing the landmark distances observed in the object to corresponding landmark distances in the 3D model to determine a scale factor between the 3D model and the object.

10. The method of claim 9, wherein the degree of error is a root mean square error, and wherein the root mean square error is determined based on a root mean square error calculation between the landmark distances observed in the object and the corresponding landmark distances in the 3D model.

11. The method of claim 6, wherein a surface of the water-tight convex hull representation is colored mapped.

* * * * *